United States Patent
Lee et al.

(10) Patent No.: US 9,429,698 B2
(45) Date of Patent: Aug. 30, 2016

(54) DISPLAY DEVICE

(71) Applicant: SAMSUNG DISPLAY CO., LTD., Yongin-si, Gyeonggi-do (KR)

(72) Inventors: Dong-Hyeon Lee, Seoul (KR); Dong-Hoon Kim, Suwon-si (KR); Jin Seo, Osan-si (KR); Jun-Woo You, Seongnam-si (KR); Lu-Ly Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 22 days.

(21) Appl. No.: 14/497,079

(22) Filed: Sep. 25, 2014

(65) Prior Publication Data
US 2015/0293292 A1 Oct. 15, 2015

(30) Foreign Application Priority Data
Apr. 10, 2014 (KR) .................. 10-2014-0042959

(51) Int. Cl.
F21V 8/00 (2006.01)
G02F 1/1333 (2006.01)
G02F 1/1335 (2006.01)

(52) U.S. Cl.
CPC .......... *G02B 6/0026* (2013.01); *G02B 6/0088* (2013.01); *G02F 1/133308* (2013.01); *G02F 2001/133317* (2013.01); *G02F 2001/133614* (2013.01)

(58) Field of Classification Search
CPC .............. G02B 6/0028; G02B 6/0088; G02F 1/33308; G02F 2001/13317; G02F 2001/133614
USPC ........................................................ 362/608
See application file for complete search history.

(56) References Cited

U.S. PATENT DOCUMENTS

| | | | |
|---|---|---|---|
| 2010/0283914 A1* | 11/2010 | Hamada | G02B 6/0026 348/731 |
| 2012/0307518 A1 | 12/2012 | Lee et al. | |
| 2013/0010229 A1 | 1/2013 | Shin et al. | |
| 2013/0050612 A1 | 2/2013 | Hur et al. | |
| 2013/0128614 A1* | 5/2013 | Lee | G02B 6/0023 362/609 |
| 2013/0215643 A1 | 8/2013 | Hikmet et al. | |
| 2013/0271700 A1* | 10/2013 | Nakamura | G02B 6/0026 349/65 |
| 2013/0329161 A1* | 12/2013 | Park | G02F 1/133615 349/58 |
| 2013/0336003 A1* | 12/2013 | Yang | G02B 6/42 362/608 |
| 2014/0036532 A1* | 2/2014 | Lee | G02B 6/0023 362/608 |
| 2014/0240644 A1* | 8/2014 | Abe | G02B 6/0088 349/71 |

FOREIGN PATENT DOCUMENTS

| | | |
|---|---|---|
| JP | 2008-091113 | 4/2008 |
| JP | 2012-215674 | 11/2012 |
| KR | 10-2005-0115463 | 12/2005 |
| KR | 10-2012-0060540 | 6/2012 |
| KR | 10-2012-0066322 | 6/2012 |
| KR | 10-2012-0068499 | 6/2012 |
| KR | 10-1162357 | 6/2012 |

* cited by examiner

*Primary Examiner* — Laura Tso
(74) *Attorney, Agent, or Firm* — Innovation Counsel LLP

(57) ABSTRACT

A display device includes a light source, a light guide plate in which light emitted from the light source is incident on one surface and is emitted to the other surface, a bottom case configured to accommodate the light guide plate, a wavelength conversion unit between the light source and the light guide plate, a wavelength conversion unit holder disposed on the bottom case on an area corresponding to one end portion of the wavelength conversion unit, and a wavelength conversion unit fixed to the wavelength conversion unit holder.

17 Claims, 7 Drawing Sheets

DISPLAY DEVICE

CROSS-REFERENCE TO RELATED APPLICATION

This application claims priority to and the benefit of Korean Patent Application No. 10-2014-0042959, filed on Apr. 10, 2014, in the Korean Intellectual Property Office, the content of which is incorporated herein in its entirety by reference.

BACKGROUND

1. Field

Embodiments of the inventive concept relate to a display device with an improved support configuration for a wavelength conversion unit.

2. Description of Related Technology

A liquid crystal display (LCD) is a type of flat panel displays (FPDs), which is the most widely used these days, and is configured such that a liquid crystal layer is interposed between two substrates having electrodes, so that liquid crystal molecules of the liquid crystal layer are rearranged upon applying voltage to the electrodes, thereby adjusting the amount of transmitted light.

A display device, such as a liquid crystal display (LCD), may include a display substrate for displaying an image and may include a backlight unit (BLU) for supplying light to the display substrate. The backlight unit may include a light source and may be classified into three types: a direct type, an edge type, and a corner type, based on positions of the light source.

A set of substantially low-power high-efficiency light-emitting elements, such as light-emitting diodes (LEDs) may be used as a light source in a backlight unit. The LED light source may emit blue light. The blue light may be converted to white light by wavelength-converting materials such as a phosphor. Accordingly, a backlight unit has been suggested to realize white light by inserting a wavelength conversion unit between a blue LED light source and a light guide plate.

Meanwhile, a wavelength conversion unit is conventionally fixed between a light source and a light guide plate, and in order to maintain a space between the wavelength conversion unit and the light guide plate, a separate wavelength conversion unit-fixing device is included in a backlight unit. However, due to the fixing device, light emitted from the light source may not be uniformly guided to the light guide plate.

Further, some blue light emitted from the light source may fail to pass through the wavelength conversion unit, which results in defects of blue light leak that is visible as light leakage.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding effective filing dates of subject matter disclosed herein.

SUMMARY

Aspects of embodiments of the inventive concept are directed toward a display device which is structured to fix a wavelength conversion unit such that light emitted from a light source is uniformly guided to a light guide plate, and in which blue light is not visible.

According to an embodiment of the inventive concept, a display device includes a light source; a light guide plate in which light emitted from the light source is incident on one surface and is emitted to the other surface; a bottom case configured to accommodate the light guide plate; a wavelength conversion unit between the light source and the light guide plate; a wavelength conversion unit holder disposed on the bottom case on an area corresponding to one end portion of the wavelength conversion unit; and a wave length conversion unit fixed to the wavelength conversion unit holder.

The display device may further include a supporting bar disposed between the bottom case and the wave length conversion unit, and a reflection member disposed between the wavelength conversion unit and the supporting bar.

The supporting bar may have a bar-like or line-like shape. The supporting bar may include a protrusion corresponding to an area in which a light guiding plate and the supporting bar overlap.

The supporting bar may include a first area in which the wavelength conversion unit is seated; and a second area in which the light guiding plate is seated.

The display device may further include a mold frame having an inner side that is adjacent to the wavelength conversion unit and a reflection member disposed between the wavelength conversion unit and the inner side of the mold frame.

The mold frame may include a protrusion extending toward the light guiding plate, one side of the wavelength conversion unit being fixed by the protrusion.

A line connecting edges of the protrusion, the light guiding plate, and the second area near the wave length conversion unit may form a straight line.

The wavelength conversion unit holder may include first and second supports extending substantially parallel to each other from a fixing portion, and spaced a predetermined distance apart from each other, the wavelength conversion unit holder being configured to support two sides of the wavelength conversion unit.

A thickness of the first support may determine a space between the light source and the wavelength conversion unit.

A thickness of the second support may determine a space between the wavelength conversion unit and the light guide plate.

The wavelength conversion unit holder may further include a fixing portion that is fixed to the bottom case.

The light guide plate may have an edge portion that is seated on the fixing portion of the wavelength conversion unit holder.

The display device may further include a mold frame having an inner side that is adjacent to the wavelength conversion unit.

The display device may further include a reflection member between the wavelength conversion unit and the inner side of the mold frame.

The mold frame may include a protrusion extending toward the light guiding plate, one side of the wavelength conversion unit being fixed by the protrusion.

The bottom case may include a first area on which the wavelength conversion unit is seated and a second area protruded from the first area toward a light guide plate.

A line connecting edges of the protrusion, the light guiding plate, and the second area near the wave length conversion unit may form a straight line.

According to embodiments of the inventive concept, a display device allows a wavelength conversion unit to be fixed by utilizing a mold frame, a supporting bar, and a wavelength conversion unit holder, and thus no further fixing device is required.

Further, according to embodiments of the inventive concept, a reflection member is disposed between a mold frame and a wavelength conversion unit and between a supporting bar and the wavelength conversion unit such that blue light is prevented from leaking.

Further, according to embodiments of the inventive concept, respective spaces between a light source and a wavelength conversion unit and between the wavelength conversion unit and a light guide plate are maintained by utilizing a wavelength conversion unit holder.

The foregoing summary is illustrative only and is not intended to be in any way limiting the claims of the inventive concept. In addition to the illustrative aspects, embodiments, and features described above, further aspects, embodiments, and features will become apparent by reference to the drawings and the following detailed description.

DETAILED DESCRIPTION

Figure 1:
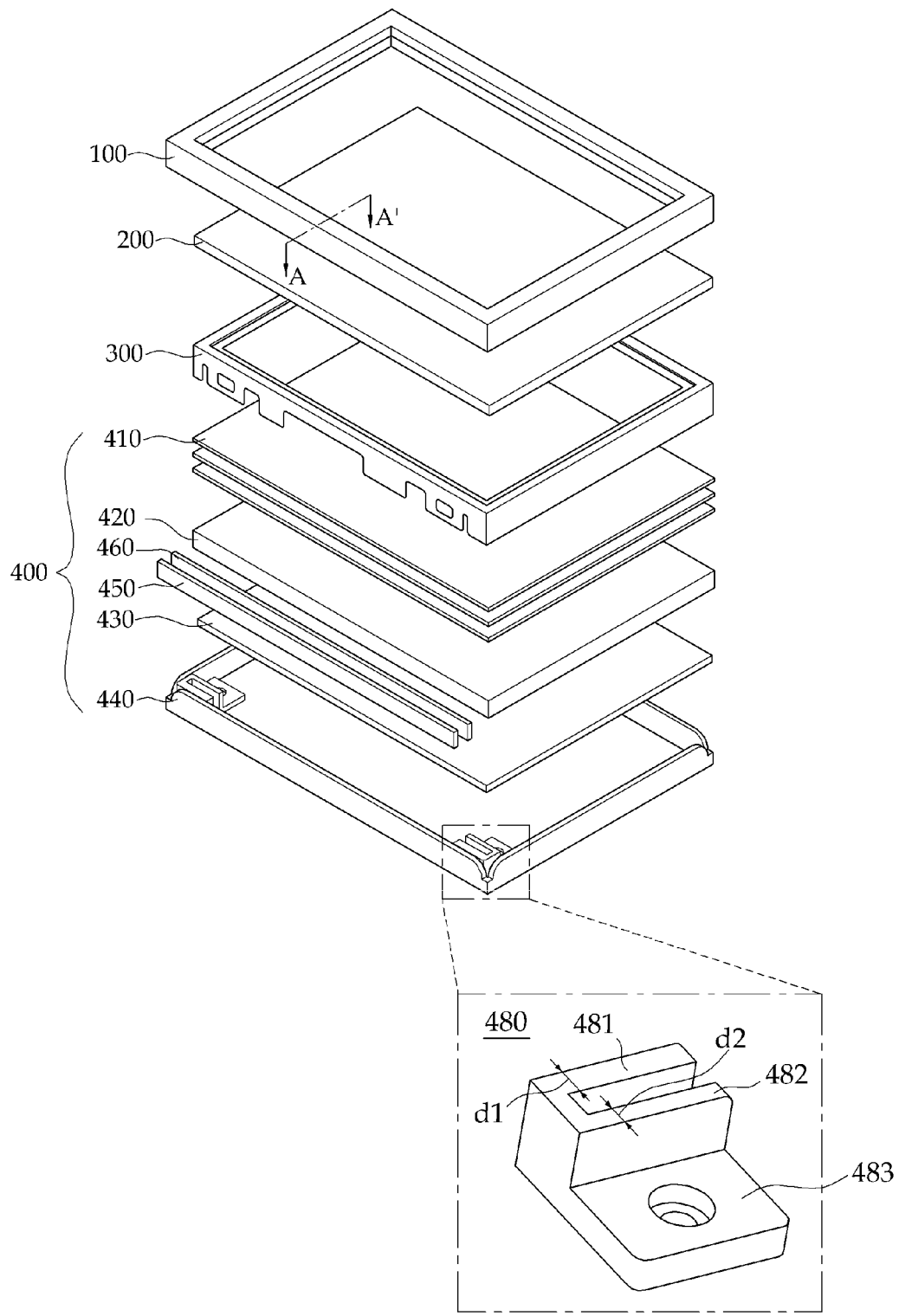
FIG. 1 is an exploded perspective view of a display device according to an embodiment of the inventive concept.

Hereinafter, embodiments of the inventive concept are described with reference to the accompanying drawings.

Example embodiments of the inventive concept are illustrated in the accompanying drawings and described in the specification. The scope of the inventive concept is not limited to the example embodiments and should be construed as including all potential changes, equivalents, and substitutions to the example embodiments.

In the specification, when a first element is referred to as being "connected" to a second element, the first element may be directly connected to the second element or indirectly connected to the second element with one or more intervening elements interposed therebetween. The terms "comprises," "comprising," "includes," and/or "including," when used in this specification, may specify the presence of stated features, integers, steps, operations, elements, and/or components, but do not preclude the presence or addition of one or more other features, integers, steps, operations, elements, and/or components.

Although the terms "first," "second," and "third" and the like may be used herein to describe various elements, these elements should not be limited by these terms. These terms may be used to distinguish one element from another element. Thus, "a first element" could be termed "a second element" or "a third element," and "a second element" and "a third element" can be termed likewise without departing from the teachings herein. The description of an element as a "first" element may not require or imply the presence of a second element or other elements. The terms "first," "second," etc. may also be used herein to differentiate different categories or sets of elements. For conciseness, the terms "first," "second," etc. may represent "first-type (or first-set)," "second-type (or second-set)," etc., respectively.

Like reference numerals may refer to like elements in the specification.

Hereinafter, a display device according to an embodiment of the inventive concept will be described as a liquid crystal display (LCD), but embodiments of the inventive concept are not limited thereto. In addition to the liquid crystal display, any display device is available if it is capable of displaying an image by receiving light from a backlight unit.

Figure 2:
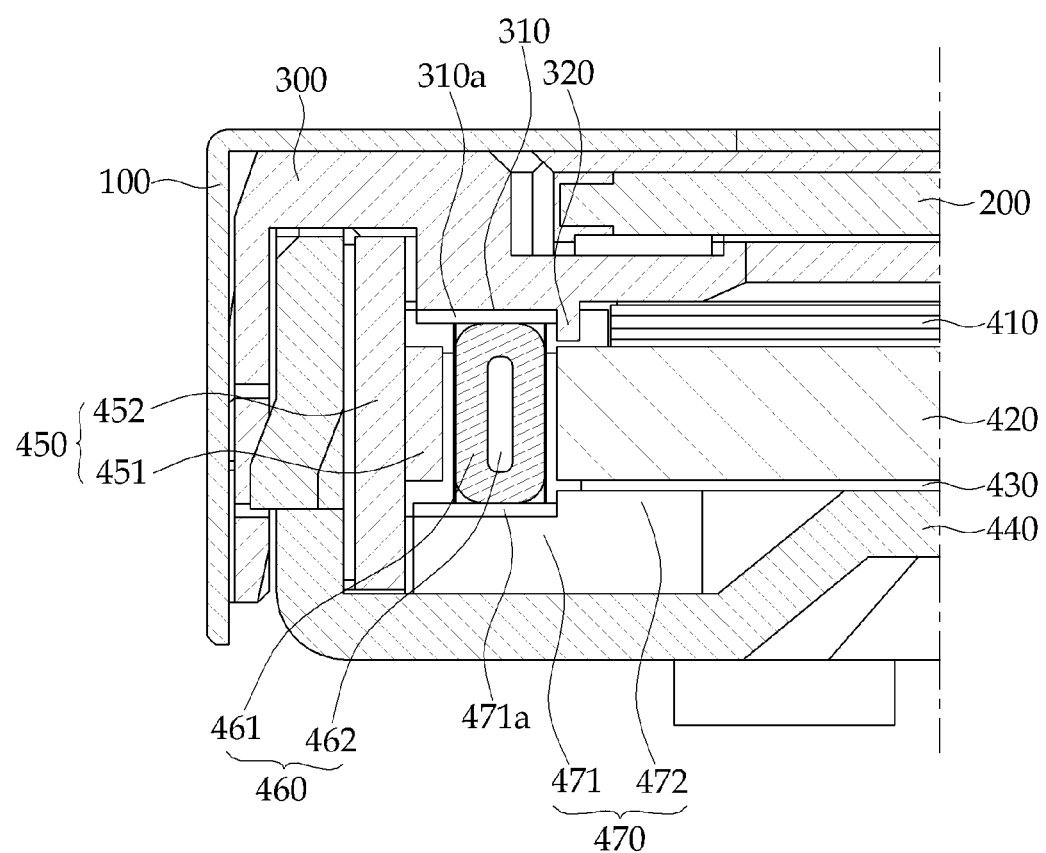
FIG. 2 is a cross-sectional view taken along line A-A' of FIG. 1.

FIG. 1 is an exploded perspective view of a display device according to an embodiment of the inventive concept. FIG. 2 is a cross-sectional view taken along line A-A' of FIG. 1.

Referring to FIGS. 1 and 2, a display device according to one embodiment includes a display substrate 200 configured to display an image, a backlight unit 400 configured to supply light to the display substrate 200, a top case 100 provided to cover the display substrate 200, and a mold frame 300 configured to couple the top case 100 and a bottom case 440. The display substrate 200 may be seated on the mold frame 300.

The mold frame 300 may be coupled to the bottom case 440, and may accommodate the display substrate 200. The mold frame 300 may be made of a flexible material such as plastic in order to prevent the display substrate 200 from being damaged.

The top case 100 may be coupled to the mold frame 300 and the bottom case 440 so as to cover the display substrate 200 seated on the mold frame 300. The top case 100 may have an open window in a central portion thereof to expose the display substrate 200.

The top case 100 may be coupled to the mold frame 300 and the bottom case 440 using hooks and/or screws. The top case 100 and the bottom case 440 may be coupled to each other in a variety of forms.

The backlight unit 400 may include an optical sheet 410, a light guide plate 420, a reflective sheet 430, a bottom case 440, a light source unit 450, a wavelength conversion unit 460, a supporting bar 470, and a wavelength conversion unit holder 480.

The light source unit 450 may include a light source 451 and a circuit board 452 on which the light source 451 is disposed. The light source unit 450 may be disposed at a corner portion, an edge portion or a bottom portion of the light guide plate 420. That is, the light source unit 450 may emit light to the corner portion, the edge portion or the bottom portion of the light guide plate 420. That is to say, the light guide plate 420 may have a light incident side at the corner, edge or bottom.

The light source 451 may include at least one LED chip (not shown) and a package (not shown) configured to accommodate the LED chip. In one embodiment, the LED chip (not shown) may be a gallium nitride (GaN) LED chip that emits blue light.

The circuit board 452 may be, for example, a printed circuit board (PCB) or a metal core PCB.

The light source unit 450 may be disposed on at least one corner, side surface or bottom of the light guiding plate 420. For example, the light source unit 450 may be disposed on one corner, two corners or all corners of the light guiding plate 420, may be disposed on one side surface, two side surfaces, or all side surfaces of the light guide plate 420, and may be disposed on the bottom of the light guiding plate 420 according to the size, luminance, uniformity and so on of the display substrate 200.

A heat dissipation member (not shown) may be disposed between the light source unit 450 and the bottom case 440.

The heat dissipation member may emit heat generated from the light source unit 450 to the outside. In the case where the light source unit 450 is disposed to be shaped like a bar or line at one side of the bottom case 440, the heat dissipation member may be a metal frame having a shape of a bar or line. As described above, the heat dissipation member may have a variety of shapes according to shapes of the light source unit 450.

Light emitted from the light source 451 may be incident on the light incident side of the light guide plate 420 and the light may be emitted to a light emitting surface of the light source 451. The light guide plate 420 may uniformly distribute light received from the light source unit 450 to the display substrate 200. The light guide plate 420 may be disposed in the vicinity of the light source unit 450 and may be accommodated in the bottom case 440.

The light guide plate 420 may be provided in the form of, for example, a quadrangular plate like the display substrate 200, but embodiments of the inventive concept are not limited thereto. In the case where LED chips are used as the light source 451, the light guide plate 420 may be formed in various shapes including predetermined grooves, protrusions, or the like according to the position of the light source 451.

The light guide plate 420 is described as a plate for ease of description, but it may be provided in the form of a sheet or film to achieve slimness of a display device. That is, the light guide plate 420 may include not only a plate but also a film for guiding light.

The light guide plate 420 may be made of a light-transmissive material, e.g., an acrylic resin such as polymethylmethacrylate (PMMA) or polycarbonate (PC), so as to guide light efficiently.

The optical sheet 410 may be disposed on the light guide plate 420, and may serve to diffuse and collect light transmitted from the light guide plate 420. The optical sheet 410 may include a diffusion sheet, a prism sheet, a protective sheet, and the like.

The diffusion sheet may diffuse light received from the light guide plate 420 so as to prevent the light from being partially concentrated.

The prism sheet may have triangular prisms on one surface thereof in a predetermined arrangement, and the prism sheet may be disposed on the diffusion sheet so as to collect light diffused from the diffusion sheet in a direction perpendicular to the display substrate 200.

The protective sheet may be disposed on the prism sheet so as to protect a surface of the prism sheet and diffuse light to obtain uniformly distributed light.

The reflective sheet 430 may be disposed between the light guide plate 420 and the bottom case 440, so that light emitted downwards from the light guide plate 420 may be reflected towards the display substrate 200, thereby increasing light efficiency.

The reflective sheet 430 may be made of, for example, polyethylene terephthalate (PET) having reflective properties, and one surface of the reflective sheet 430 may be coated with a diffusion layer containing, for example, titanium dioxide. The reflective sheet 430 may also be made of a material containing a metal such as silver (Ag).

The bottom case 440 may accommodate the reflective sheet 430 and the light guide plate 420. The bottom case 440 may be made of a metal material having hardness such as stainless steel or a material having good heat dissipation properties such as aluminum or aluminum alloys. In this embodiment, the bottom case 440 may be configured to maintain a shape of a display device and protect a variety of components accommodated in the bottom case 440.

The wavelength conversion unit 460 may be disposed between the light source 451 and the light guide plate 420. The wavelength conversion unit 460 may include a glass tube 461 and a phosphor 462 sealed in the glass tube 461.

The glass tube 461 may be configured to seal the phosphor 462 and prevent moisture infiltration into the phosphor 462. The glass tube 461 may be a bar-shaped or line-shaped tube and may have a polygonal or oval cross-section.

The phosphor 462 is a substance to convert a wavelength of light. For example, the phosphor 462 may convert wavelength of blue light emitted from a blue LED light source into white light.

The phosphor 462 may include quantum dots. The phosphor 462 may further include at least one of metal elements selected from a group consisting of sulfide, silicon, and nitride.

The quantum dot may convert wavelengths of light so as to emit desired colors of light. The quantum dot may convert different wavelengths of light depending on the size thereof. Therefore, a diameter of the quantum dot may be adjusted according to a desired color of light.

Further, the phosphor 462 may include a green conversion particle and a red conversion particle that include the quantum dots. The green conversion particle may have a smaller diameter than the red conversion particle.

The quantum dot emits much stronger fluorescent light in a narrow wavelength range than a general fluorescent material, and the core of the quantum dot is composed of II-VI semiconductor nanocrystals such as CdSe, CdTe, CdS, and the like.

For example, the quantum dot may have a diameter of about 2 nm to about 10 nm, and the size thereof may be adjusted where necessary.

In the case where the quantum dot has a small diameter, a wavelength of emitted light becomes shorter such that blue-based light may be produced. In contrast, when the quantum dot has a large diameter, the wavelength of emitted light becomes longer such that red-based light may be produced.

Further, the quantum dot may have a dual structure including an inner core and an outer shell surrounding the inner core. For instance, a CdSe/ZnS quantum dot may include an inner core made of CdSe and an outer shell made of ZnS.

Light wavelength conversion by the quantum dot will be described below in detail. For example, light emitted from a blue LED light source may pass through the quantum dot. The light passing through a small-sized quantum dot may be converted to green light, the light passing through a large-sized quantum dot may be converted to red light, and the light traveling between the quantum dots may remain unchanged as blue light.

Thus, these three colors of red R, green G, and blue B of light are mixed so that white light is produced. In the above, the small-sized quantum dot may be the green conversion particle, and the large-sized quantum dot may be the red conversion particle.

The supporting bar 470 may be disposed between the bottom case 440 and the wavelength conversion unit 460, and may fix one side of the wavelength conversion unit 460 to the bottom case 440. In the case where the wavelength conversion unit 460 is disposed parallel to one side of the light guide plate 420, the supporting bar 470 may have a shape of a bar or line. The supporting bar 470 may be made of a metal material so as to perform heat dissipation function to dissipate heat generated from the light source unit 450 and the wavelength conversion unit 460 to the outside. The supporting bar 470 may be made by a extrusion molding method.

As illustrated in FIG. 2, the supporting bar 470 may include a first area 471 on which the wavelength conversion unit 460 is seated and a second area 472 which protruded from the first area toward the light guide plate 420. The reflection sheet 430 and the light guide plate 420 may be disposed on the second area 472. A reflection member 471a may be disposed on the first area 471 of the supporting bar 470. The supporting bar 470 may fix one side of the wavelength conversion unit 460 using the first area 471 and the second area 472 protruded from the first area 471.

Figure 3:
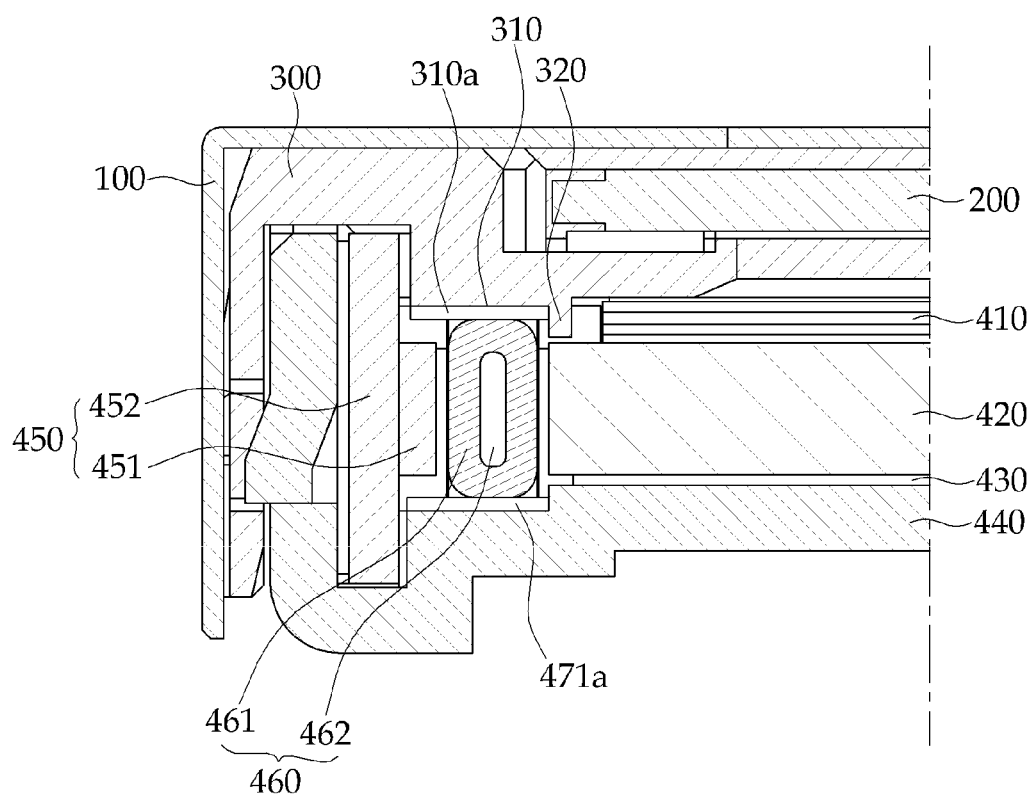
FIG. 3 is a cross-sectional view of a display device according to another embodiment of the inventive concept.

FIG. 3 is a cross-sectional view of a display device according to another embodiment of the inventive concept.

Referring to FIG. 3, a display device according to another embodiment may include a bottom case 440 bent inwards in a manner similar to the supporting bar 470 illustrated in FIG. 2 instead of including a separate supporting bar 470 such that one side of a wavelength conversion unit 460 is directly fixed to the bottom case 440. The bottom case 440 may include a first area on which the wavelength conversion unit 460 is seated and a second area protruded from the first area toward the light guide plate 420. The reflection sheet 430 and the light guide plate 420 may be disposed on the second area. A reflection member 471a may be disposed on the first area of the bottom case 440. The bottom case 440 may fix one side of the wavelength conversion unit 460 using the first area and the second area protruded from the first area.

Referring back to FIG. 2, the reflection member 471a may be disposed on the first area 471 of the supporting bar 470, but it may also be disposed on the second area 472 of the supporting bar 470. The reflection member 471a may include at least one of a white reflective film and a silver (Ag) reflective film. The reflection member 471a may stick to the first area 471 using a tape.

The reflection member 471a may serve to diffusely reflect blue light emitted from the light source 451, which leaks towards the glass tube 461 that is not filled with the phosphor 462. Consequently, the reflected blue light may pass through the phosphor 462 of the wavelength conversion unit 460 and may be converted to white light.

The wavelength conversion unit holder 480 may be disposed on the bottom case 440 on an area corresponding to one end portion of the wavelength conversion unit 460. In one embodiment, the wavelength conversion unit holders 480 may be disposed on the bottom case 440 on areas corresponding to two end portions of the wavelength conversion unit 460, respectively. The wave length conversion unit 460 may be fixed to the wavelength conversion unit holder 480.

The wavelength conversion unit holder 480 may include a fixing portion 483 where the wavelength conversion unit holder 480 is fixed to the bottom case 440. A first support 481 and a second support 482 extend substantially perpendicular to the fixing portion 483 and spaced a predetermined distance apart. The predetermined distance between the first support 481 and the second support 482 is a space to accommodate the wave length conversion unit 460. The first support 481 and the second support 482 are substantially parallel to each other. End portion of the first support 481 and the second support 482 is connected by the connection portion. At least one end portion of the wave length conversion unit 460 may be inserted into a space between the first support and the second support.

The fixing portion 483 of the wavelength conversion unit holder 480 may be fixed to the bottom case 440 utilizing hook coupling, screw coupling, double-sided tape, or the like.

An edge portion of the light guide plate 420 may be disposed on the fixing portion 483 of the wavelength conversion unit holder 480. In this case, a space between the light source 451 and the wavelength conversion unit 460 may be determined in accordance with a thickness d1 of the first support 481.

Further, a space between the wavelength conversion unit 460 and the light guide plate 420 may be determined in accordance with a thickness d2 of the second support 482.

In other words, the first and second supports 481 and 482 of the wavelength conversion unit holder 480 may serve as a panel guide to maintain the spaces between the light source 451 and the wavelength conversion unit 460 and between the wavelength conversion unit 460 and the light guide plate 420.

A lower surface of the mold frame 300 may be coupled adjacently to the bottom case 440, the light source unit 450, the wavelength conversion unit 460, the optical sheet 410, and the like. The lower surface of the mold frame 300, which is adjacent to the wavelength conversion unit 460 in particular, may be called an inner side surface 310.

The mold frame 300 may include the inner side surface 310 and a protrusion portion 320 having a protrusion toward the light guiding plate 420. The mold frame 300 may fix one side of the wavelength conversion unit 460 utilizing the inner side surface 310 and the protrusion portion 320 having the step.

A reflection member 310a may be disposed between the inner side surface 310 of the mold frame 300 and the wavelength conversion unit 460. The reflection member 310a may include at least one of a white reflective film and a silver reflective film. The reflection member 310a may stick to the mold frame 300 using a tape.

The reflection member 310a may serve to diffusely reflect blue light emitted from the light source 451, which leaks towards the glass tube 461 that is not filled with the phosphor 462. As a result, the reflected blue light may pass through the phosphor 462 of the wavelength conversion unit 460 and may be converted to white light. According to the embodiment of the inventive concept, a line connecting edges of the protrusion portion 320, the light guiding plate 420, and the second area 472 near the wave length conversion unit 460 may form a straight line as disclosed in FIG. 2. According to the embodiment of the inventive concept, a line connecting edges of the second area of the bottom case 440, the protrusion portion 320, and the light guiding plate 420 may form a straight line as disclosed in FIG. 3.

FIGS. 4 to 7 are diagrams illustrating a procedure for combining components of a display device according to an embodiment of the inventive concept.

Figure 4:
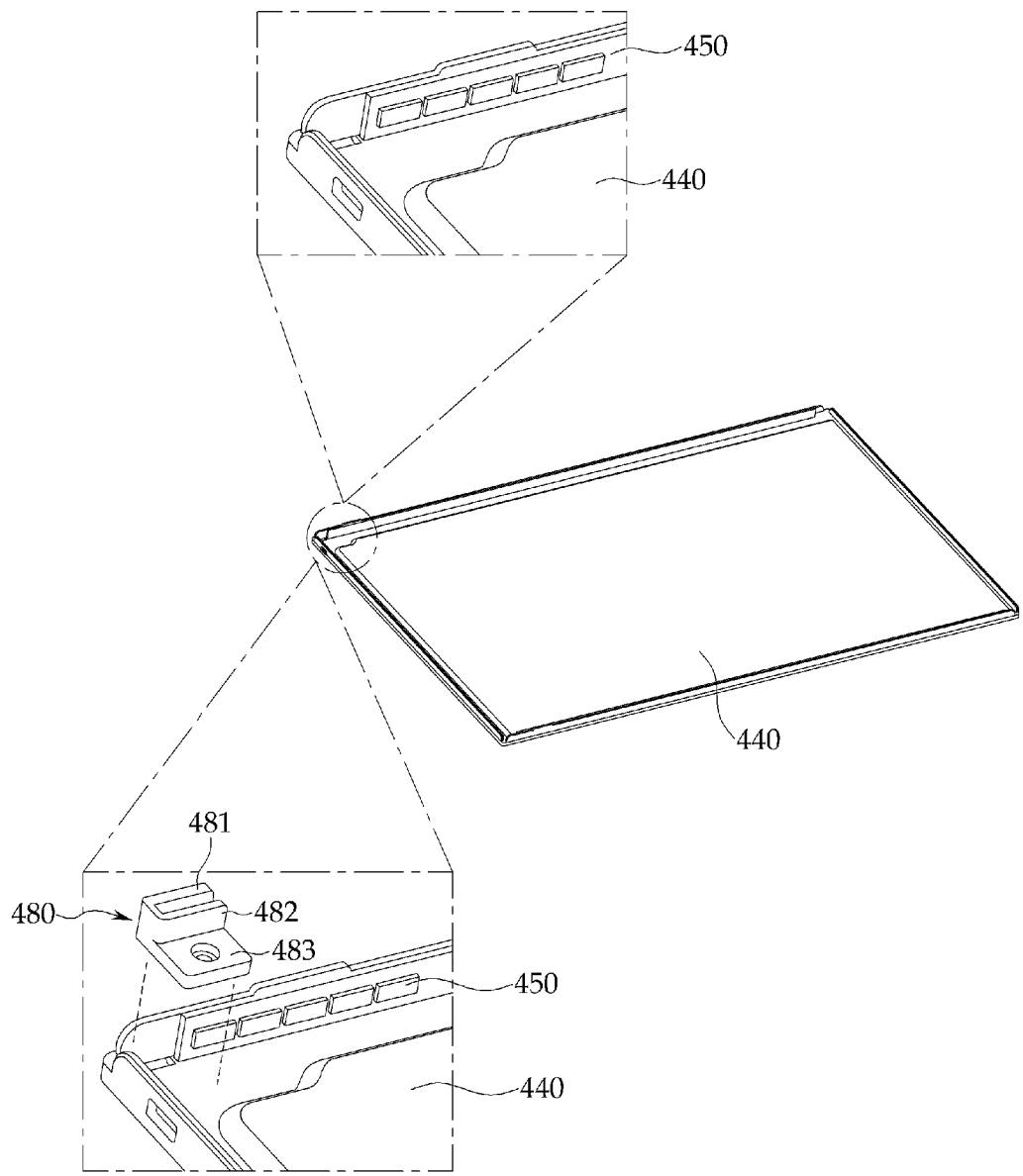
FIGS. 4 to 7 are diagrams illustrating a procedure for combining components of a display device according to an embodiment of the inventive concept.

Referring to FIG. 4, the light source unit 450 and the wavelength conversion unit holder 480 may be coupled to the bottom case 440.

The light source unit 450 may be disposed on one side surface of the bottom case 440, but this is for illustrative purposes only. The light source unit 450 may also be disposed on two side surfaces or four side surfaces of the bottom case 440.

The wavelength conversion unit holder 480 may be disposed on at least one edge portion of the bottom case 440 on which the light source unit 450 is disposed. The first and second supports 481 and 482 of the wavelength conversion unit holder 480 may be disposed on the at least one edge portion. The fixing portion 483 of the wavelength conversion unit holder 480 may be coupled to the bottom case 440 utilizing hook coupling, screw coupling, double-sided tape, or the like.

Figure 5:
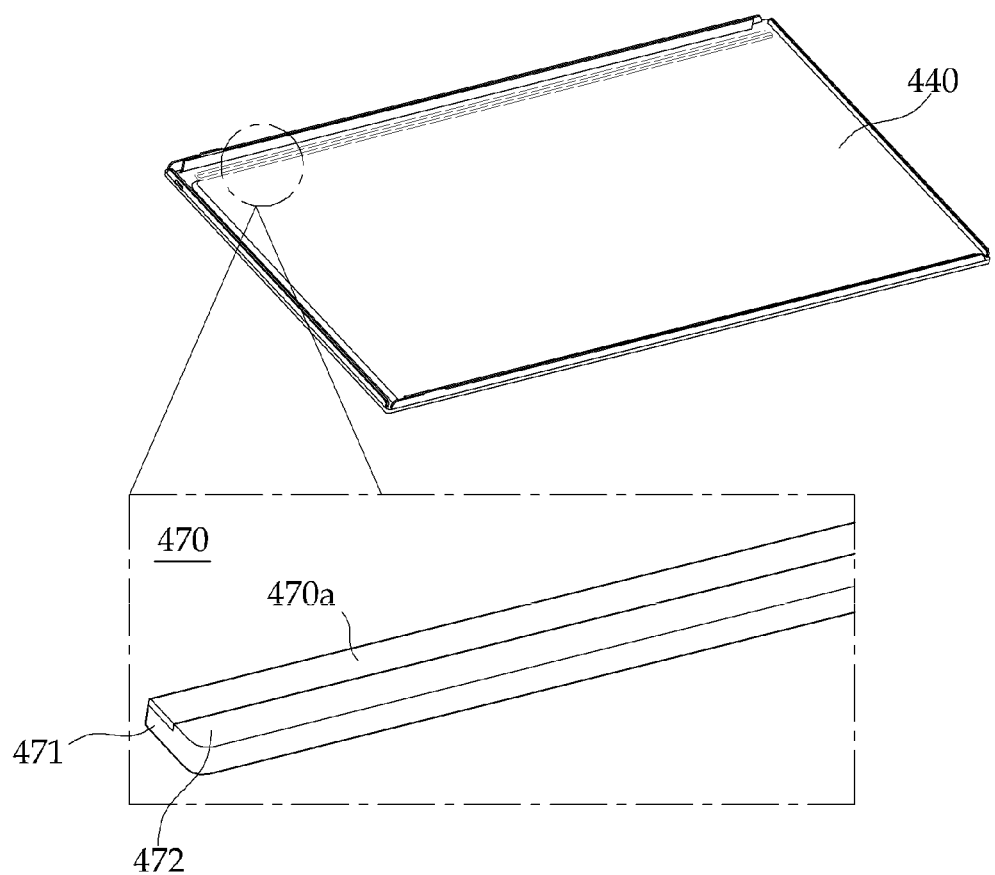

Referring to FIG. 5, the supporting bar 470 may be coupled to the bottom case 440.

In the supporting bar 470, the first area 471 to which a reflection member 470a is bonded may be disposed towards the light source 451.

The wavelength conversion unit 460 may be disposed on the first area 471, and thus the supporting bar 470 may be arranged such that the first area 471 of the supporting bar 470 may be placed collinearly with an area between the first and second supports 481 and 482 of the wavelength conversion unit holder 480.

Figure 6:
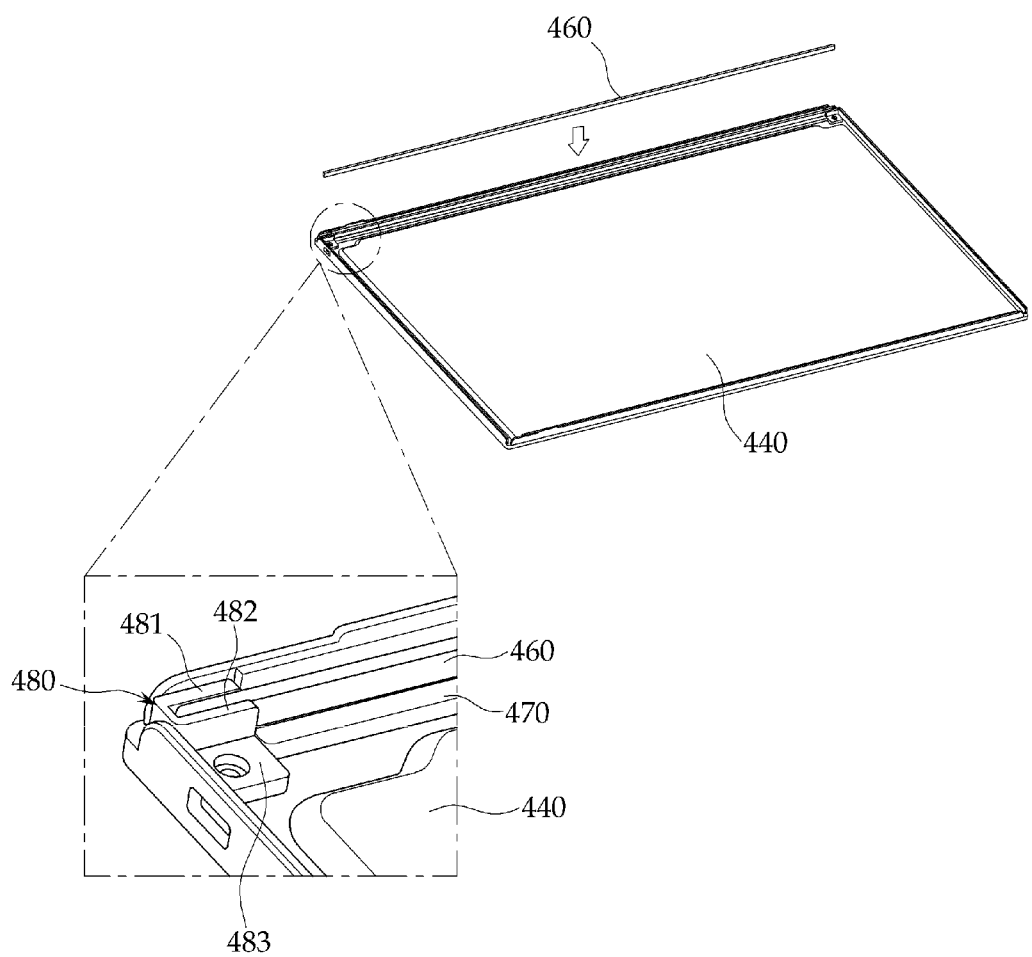
Figure 7:
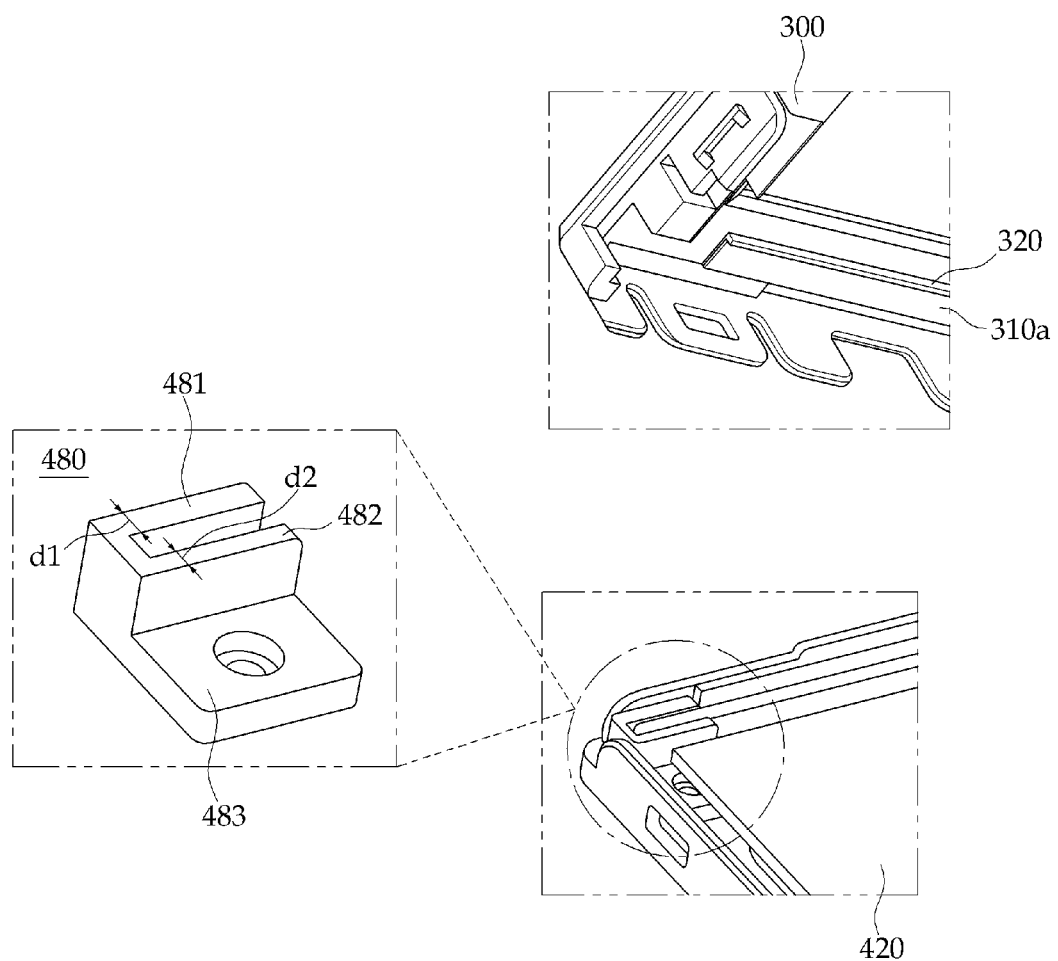

Referring to FIGS. 6 and 7, the wavelength conversion unit 460 may be disposed on the first area 471 of the supporting bar 470. In this case, two end portions of the wavelength conversion unit 460 may be press-fitted into the area between the first and second supports 481 and 482 of the wavelength conversion unit holder 480. Therefore, a space between the light source 451 and the wavelength conversion unit 460 may be determined by a thickness d1 of the first support 481 of the wavelength conversion unit holder 480.

Further, the supporting bar 470 may fix one side of the wavelength conversion unit 460 utilizing the first area 471 and the second area 472 having a protrusion.

Referring to FIG. 7, the reflective sheet (not shown), the light guide plate 420, the optical sheet (not shown), and the like may be disposed on the bottom case 440, and the mold frame 300 may be placed thereon.

In this case, an edge portion of the light guide plate 420 may be disposed on the fixing portion 483 of the wavelength conversion unit holder 480, and thus a space between the wavelength conversion unit 460 and the light guide plate 420 may be determined by a thickness d2 of the second support 482 of the wavelength conversion unit holder 480.

As described above, in a display device according to one embodiment, two sides of the wavelength conversion unit 460 may be fixed using the wavelength conversion unit holder 480, and the other two sides of the wavelength conversion unit 460 may also be fixed utilizing the supporting bar 470 and the mold frame 300, and thus four sides of the wavelength conversion unit 460 may be all fixed as a result.

In other words, the display device according to one embodiment may fix the wavelength conversion unit 460 using the mold frame 300, the supporting bar 470, the wavelength conversion unit holder 480, or other components so that no further fixing device may be required.

Consequently, a bezel width may be reduced because it is not necessary a space for a conventional wavelength conversion unit-fixing device that is separately included.

Also, a reflection member may be disposed between the mold frame 300 and the wavelength conversion unit 460, and between the supporting bar 470 and the wavelength conversion unit 460, thereby preventing blue light leak. Further, the reflection member may be made of a resilient material allowing the reflection member to act as a cushion, thereby protecting a display device from external impact.

In addition, spaces between the light source 451 and the wavelength conversion unit 460, and between the wavelength conversion unit 460 and the light guide plate 420 may be maintained by using the wavelength conversion unit holder 480.

From the foregoing, it will be appreciated that various embodiments of the inventive concept have been described herein for purposes of illustration, and that various modifications may be made without departing from the scope and spirit of the present disclosure. Accordingly, the various embodiments disclosed herein are not intended to limit the scope of the inventive concept, and the true scope and spirit of the inventive concept is indicated by the following claims, and equivalents thereof.

What is claimed is:

1. A display device comprising:
   a light source;
   a light guide plate in which light emitted from the light source is incident on one surface and is emitted to the other surface;
   a bottom case configured to accommodate the light guide plate;
   a wavelength conversion unit between the light source and the light guide plate;
   a wavelength conversion unit holder disposed on the bottom case on an area corresponding to one end portion of the wavelength conversion unit, the wavelength conversion unit being fixed to the wavelength conversion unit holder;
   a supporting bar disposed between the bottom case and the wave length conversion unit, and
   a reflection member disposed between the wavelength conversion unit and the supporting bar.

2. The display device of claim 1, wherein the supporting bar has a bar-like or line-like shape, the supporting bar including a protrusion corresponding to an area in which a light guiding plate and the supporting bar overlap.

3. The display device of claim 2, wherein the supporting bar comprises:
   a first area in which the wavelength conversion unit is seated; and
   a second area in which the light guiding plate is seated.

4. The display device of claim 2, further comprising a mold frame having an inner side that is adjacent to the wavelength conversion unit and a reflection member disposed between the wavelength conversion unit and the inner side of the mold frame.

5. The display device of claim 4, wherein the mold frame comprises a protrusion extending toward the light guiding plate, one side of the wavelength conversion unit being fixed by the protrusion.

6. The display device of claim 5, wherein a line connecting edges of the protrusion, the light guiding plate, and the second area near the wave length conversion unit form a straight line.

7. A display device comprising:
   a light source;
   a light guide plate in which light emitted from the light source is incident on one surface and is emitted to the other surface;
   a bottom case configured to accommodate the light guide plate;
   a wavelength conversion unit between the light source and the light guide plate;
   a wavelength conversion unit holder disposed on the bottom case on an area corresponding to one end portion of the wavelength conversion unit; and
   a wavelength conversion unit fixed to the wavelength conversion unit holder
   wherein the wavelength conversion unit holder comprises first and second supports extending substantially parallel to each other from a fixing portion, and spaced a predetermined distance apart from each other, the wavelength conversion unit holder being configured to support two end portions sides of the wavelength conversion unit only and not to support a middle portion of the wavelength conversion unit, and wherein a thickness of the first support determines a space between the light source and the wavelength conversion unit.

8. The display device of claim 7, wherein a thickness of the second support determines a space between the wavelength conversion unit and the light guide plate.

9. A display device comprising:
a light source;
a light guide plate in which light emitted from the light source is incident on one surface and is emitted to the other surface;
a bottom case configured to accommodate the light guide plate;
a wavelength conversion unit between the light source and the light guide plate;
a wavelength conversion unit holder disposed on the bottom case on an area corresponding to one end portion of the wavelength conversion unit; and
a wavelength conversion unit fixed to the wavelength conversion unit holder,
wherein the wavelength conversion unit holder further comprises a fixing portion that is fixed to the bottom case, and
wherein the light guide plate has an edge portion that is seated on the fixing portion of the wavelength conversion unit holder.

10. The display device of claim 7, further comprising a mold frame having an inner side that is adjacent to the wavelength conversion unit and a reflection member disposed between the wavelength conversion unit and the inner side of the mold frame.

11. The display device of claim 10, wherein the mold frame comprises a protrusion extending toward the wavelength conversion unit, and one side of the wavelength conversion unit is fixed by the protrusion.

12. The display device of claim 7,
wherein the bottom case includes a first area on which the wavelength conversion unit is seated and a second area protruded from the first area toward a light guide plate.

13. The display device of claim 12, wherein the wavelength conversion unit holder comprises first and second supports extending substantially parallel to each other from a fixing portion, and spaced a predetermined distance apart from each other, the wavelength conversion unit holder being configured to support two sides of the wavelength conversion unit.

14. The display device of claim 13, wherein a thickness of the first support determines a space between the light source and the wavelength conversion unit.

15. The display device of claim 14, wherein a thickness of the second support determines a space between the wavelength conversion unit and the light guide plate.

16. The display device of claim 15, further comprising a mold frame having an inner side that is adjacent to the wavelength conversion unit and a reflection member disposed between the wavelength conversion unit and the inner side of the mold frame, wherein the mold frame includes a protrusion extending toward a light guiding plate, one side of the wavelength conversion unit being fixed by the protrusion.

17. The display device of claim 16, wherein a line connecting edges of the protrusion, the light guiding plate, and the second area near the wave length conversion unit form a straight line.

* * * * *